Patented Sept. 16, 1930

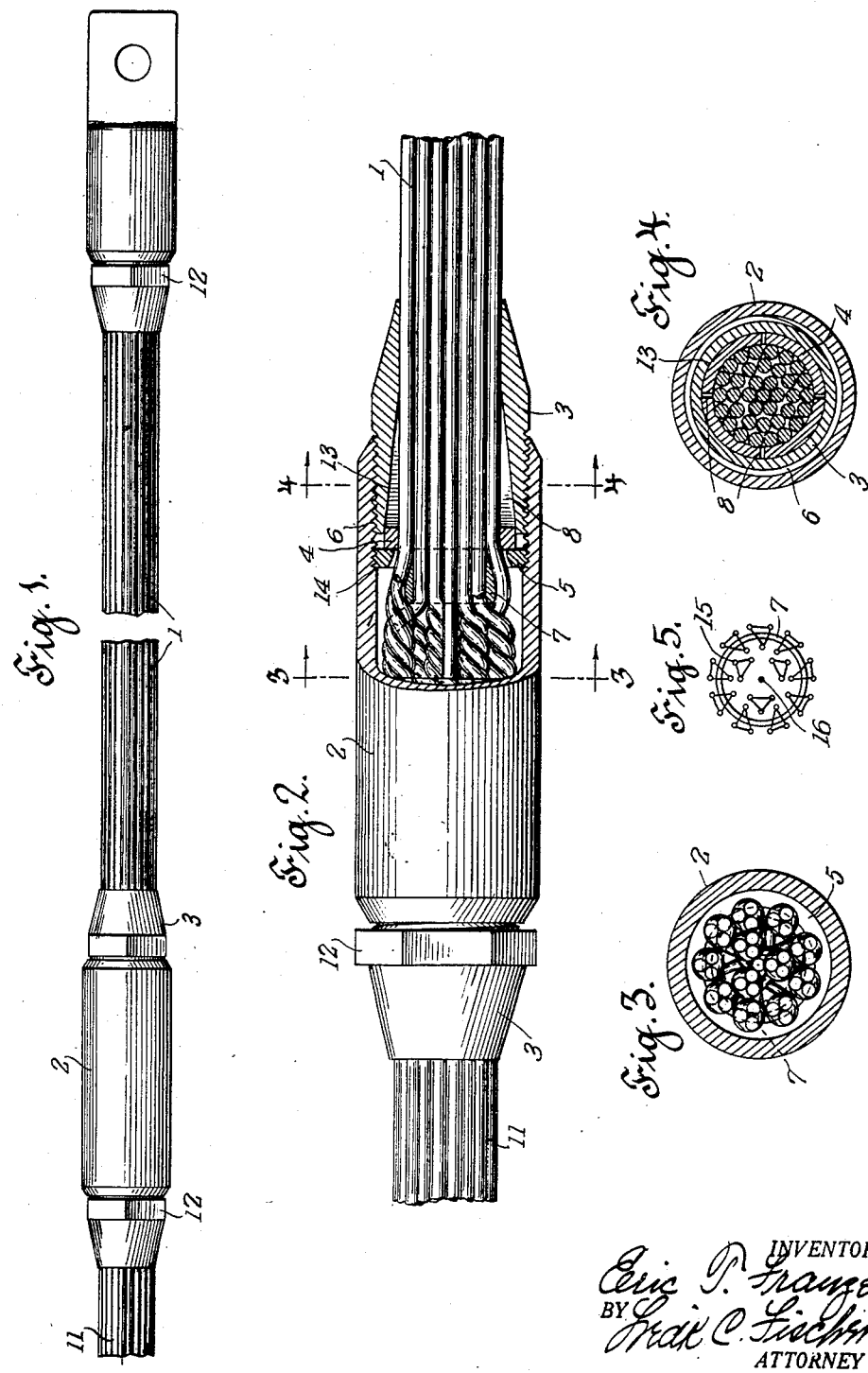

1,775,996

UNITED STATES PATENT OFFICE

ERIC T. FRANZEN, OF NEWARK, NEW JERSEY

CABLE JOINT

Application filed May 11, 1927. Serial No. 190,432.

My invention relates to devices for joining the free ends of stranded cables, and more particularly to joints for cables used in the transmission of electrical energy.

An object of my invention is to provide a joint which will uniformly distribute the pull throughout the whole cable, and maintain the normal strength of the cable.

Another object of my invention is to provide a joint which will maintain the normal conductivity of the cable, thereby eliminating the power losses due to the usual cable joints.

A further object of my invention is to provide a joint which is readily assembled and easily manufactured.

Figure 1 is a view of my joint as used in joining two stranded cables, and a view of a terminal for a cable.

Figure 2 is a longitudinal sectional view of my joint.

Figure 3 is a cross sectional view taken on the line 3—3 of Figure 2.

Figure 4 is a cross sectional view on the line 4—4 of Figure 2.

Figure 5 is a schematic view of the manner in which the strands of a cable are arranged for use with my joint.

Referring to the drawings, I show in Figure 2 a stranded cable 1, preferably made of copper, which is to be jointed to a similar cable 11. An enveloping sleeve 2, common to both cables, is in threaded engagement with a nose 3, which nose has a tapered portion 13 for wedging engagement with the wedge shaped collar 4. The collar 4 has slits 8 at opposite sides which enable the collar to better conform to the periphery of the cable. A ring 5 rests upon a shoulder 14 of the sleeve 2, and is in threaded engagement with the sleeve. This ring 5 limits the movement of the wedge-shaped collar 4 in one direction.

The ring shaped member 7, is tapered at its lower end, and is placed between the outer layer of strands of the cable and the next layer, as shown diagrammatically in Figure 5.

As shown on the drawings my joint is here applied to a cable of 37 strands, i. e., the outer layer having 18 strands, the next layer 12 strands, the next layer 6 strands, and the inner layer consisting of one strand. The ring shaped member 7 is placed between the 18 strand layer and the 12 strand layer and the strands twisted over the ring shaped member as follows: Two of the outer strands are twisted over the ring with one of the inner strands, resulting in nine twists. It will be noted every fourth strand of the inner layer is skipped, and these skipped strands 15 are in turn twisted with two strands of the next inner layer resulting in three more twists, leaving finally the center strand 16. The twists and the center strand are then cut to provide as flat a surface as possible. Of course, the other cable 11, is manipulated in the same manner; and obviously, the above method is not confined to a 37 strand cable, but may be used with cables of any number of strands.

In application, I first slip the nose 3 over one of the cables, and slide the collar 4 down the cable until the tapered surfaces of the collar 4 and the nose 3 are in engagement. I then insert the ring 7 between the layers of cables 1 and 11, twist the strands and even the ends of the twists as described above. Next the limiting ring is screwed into position against the shoulder 14 in the sleeve 2. The nose 3 is then screwed into sleeve 2 until prevented from further movement by the ring 5, the nose 3 being provided with a hexagonal surface 12 to permit the use of a wrench or tool to facilitate the screwing operation. Of course, the same operation is performed with cable 11, the noses 3 at both ends of the joint being tightened at the same time.

Now the collar 4 and the ring 7 are made of soft copper and the tightening operation causes the strands of the cable to embed themselves in the soft copper collar and ring. At the same time the enormous stress placed upon the soft copper tends to harden it and as a result a positive lock and unitary structure is provided. The twists will be so closely pressed together as to entirely conceal the ring from view, which ring has now been greatly distorted so that it is a part of the cable itself. Similarly, the splits 8 in the collar 4 have permitted the inner surface of the collar to conform exactly to the outline of the cable, and the strands of the cable embedded in this collar positively lock the parts in position.

I have provided a washer between the cables 1 and 11, in order to insure better contact.

Also I provide a terminal having an internally threaded portion 15 for threaded engagement with a nose 3. The terminal also has a flat portion 16 for connection with a bus-bar, or the like.

It will be seen from the above that I have provided a joint which uniformly distributes the pull throughout the cable, and produces increased conductivity due to the high compression of the elements.

What I claim is:

1. A joint for joining the ends of two stranded cables, consisting of a soft copper ring positioned between the outer layer of strands and the next layer of strands of a cable and over and under which the strands extend and beyond which they are twisted, a tapered collar having diametrically opposite slits mounted on the cable, a sleeve, a shoulder within said sleeve, a ring in threaded engagement with the sleeve and resting against the shoulder to limit movement of the tapered collar, and a nose in threaded engagement with the sleeve and having a tapered portion engaging the tapered collar to produce a wedging action when the nose is screwed into the sleeve.

2. A joint for joining the ends of two stranded cables, consisting of a soft metal ring positioned between layers of strands of a cable and over and under which certain strands extend and beyond which they are twisted, a tapered collar having slits mounted on the cable, a sleeve, means on the sleeve to limit movement of the tapered collar, and a nose in threaded engagement with the sleeve, said nose having a portion engaging the tapered collar to produce a wedging action to compress the ring and strands when the nose is screwed into the sleeve.

3. A joint for joining the ends of two stranded cables, consisting of a metal ring over and under which certain strands of a cable extend and beyond which they are twisted, a tapered collar, a sleeve, and a nose in threaded engagement with the sleeve, said nose having a portion engaging the tapered collar to produce a wedging action to compress the ring and strands when the nose is screwed into the sleeve.

4. A joint for joining the ends of two stranded cables, consisting of a metal ring over and under which certain strands of a cable extend and beyond which they are twisted, a sleeve, a nose in threaded engagement with the sleeve, and means engaging the nose to produce a wedging action to compress the ring and strands when the nose is screwed into the sleeve.

5. A joint for joining the ends of two stranded cables consisting of a metal ring over and under which certain strands of a cable extend and beyond which they are twisted, a tapered member, a sleeve, and means in threaded engagement with the sleeve and bearing against the tapered member to produce a wedging action to compress the ring and strands when said means are moved into the sleeve.

6. A joint for joining the ends of two stranded cables consisting of a soft copper ring over and under which certain strands of a cable extend and beyond which they are twisted, a tapered soft copper collar, a sleeve, and means in engagement with the sleeve and bearing against the collar to compress the ring and strands when said means is moved into the sleeve, the ring and collar becoming hardened as a result of said compression.

This specification signed and witnessed this 21st day of April, 1927.

ERIC T. FRANZEN.